(12) United States Patent
Akahori et al.

(10) Patent No.: US 9,499,009 B2
(45) Date of Patent: Nov. 22, 2016

(54) RUBBER COMPOSITION FOR TIRE TREADS AND PNEUMATIC TIRE USING SAME

(71) Applicant: The Yokohama Rubber Co., LTD., Minato-ku, Tokyo (JP)

(72) Inventors: Yayoi Akahori, Hiratsuka (JP); Masaki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/411,317

(22) PCT Filed: Jun. 11, 2013

(86) PCT No.: PCT/JP2013/066085
§ 371 (c)(1),
(2) Date: Dec. 24, 2014

(87) PCT Pub. No.: WO2014/002750
PCT Pub. Date: Jan. 3, 2014

(65) Prior Publication Data
US 2015/0375566 A1    Dec. 31, 2015

(30) Foreign Application Priority Data

Jun. 27, 2012 (JP) ................................ 2012-143963

(51) Int. Cl.
| | | |
|---|---|---|
| *C08L 83/00* | (2006.01) |
| *B60C 1/00* | (2006.01) |
| *B60C 11/00* | (2006.01) |
| *C08K 9/00* | (2006.01) |
| *C08K 3/36* | (2006.01) |
| *C08G 77/04* | (2006.01) |
| *C08L 21/00* | (2006.01) |
| *C08L 83/04* | (2006.01) |
| *C08L 9/06* | (2006.01) |

(52) U.S. Cl.
CPC ............... *B60C 1/0016* (2013.04); *B60C 1/00* (2013.01); *B60C 11/0008* (2013.04); *C08G 77/04* (2013.01); *C08K 3/36* (2013.01); *C08L 9/06* (2013.01); *C08L 21/00* (2013.01); *C08L 83/04* (2013.01)

(58) Field of Classification Search
CPC ....... B60C 1/00; B60C 1/0016; C08G 77/04; C08K 3/36; C08L 21/00; C08L 83/04
USPC ....... 523/205, 209; 152/209.1; 524/506, 526
See application file for complete search history.

(56) References Cited

U.S. PATENT DOCUMENTS

2007/0185239 A1* 8/2007 Tirelli ................... B60C 1/0016
523/205
2013/0172443 A1 7/2013 Kushida et al.

FOREIGN PATENT DOCUMENTS

| | | |
|---|---|---|
| JP | 2000-017107 | 1/2000 |
| JP | 2002-047417 | 2/2002 |

(Continued)

OTHER PUBLICATIONS

International Search Report for International Application No. PCT/JP2013/066085 dated Sep. 3, 2013, 4 pages, Japan.

*Primary Examiner* — William Cheung
(74) *Attorney, Agent, or Firm* — Thorpe North & Western

(57) ABSTRACT

A rubber composition for tire treads of the present technology contains a diene rubber, silica and a silane coupling agent, wherein the silane coupling agent is a polysiloxane represented by a specific average composition formula, the silica content is from 5 to 200 parts by mass per 100 parts by mass of the diene rubber, and the silane coupling agent content is from 1 to 20 mass % relative to the silica content.

18 Claims, 1 Drawing Sheet

(56) References Cited

FOREIGN PATENT DOCUMENTS

| JP | 2002-201278 | 7/2002 |
|---|---|---|
| JP | 2002-275311 | 9/2002 |
| JP | 2003-155380 | 5/2003 |
| JP | 4036519 | 1/2008 |
| JP | 2009-057395 | 3/2009 |
| WO | WO 2006-028254 | 3/2006 |
| WO | WO 2012-035998 | 3/2012 |

\* cited by examiner

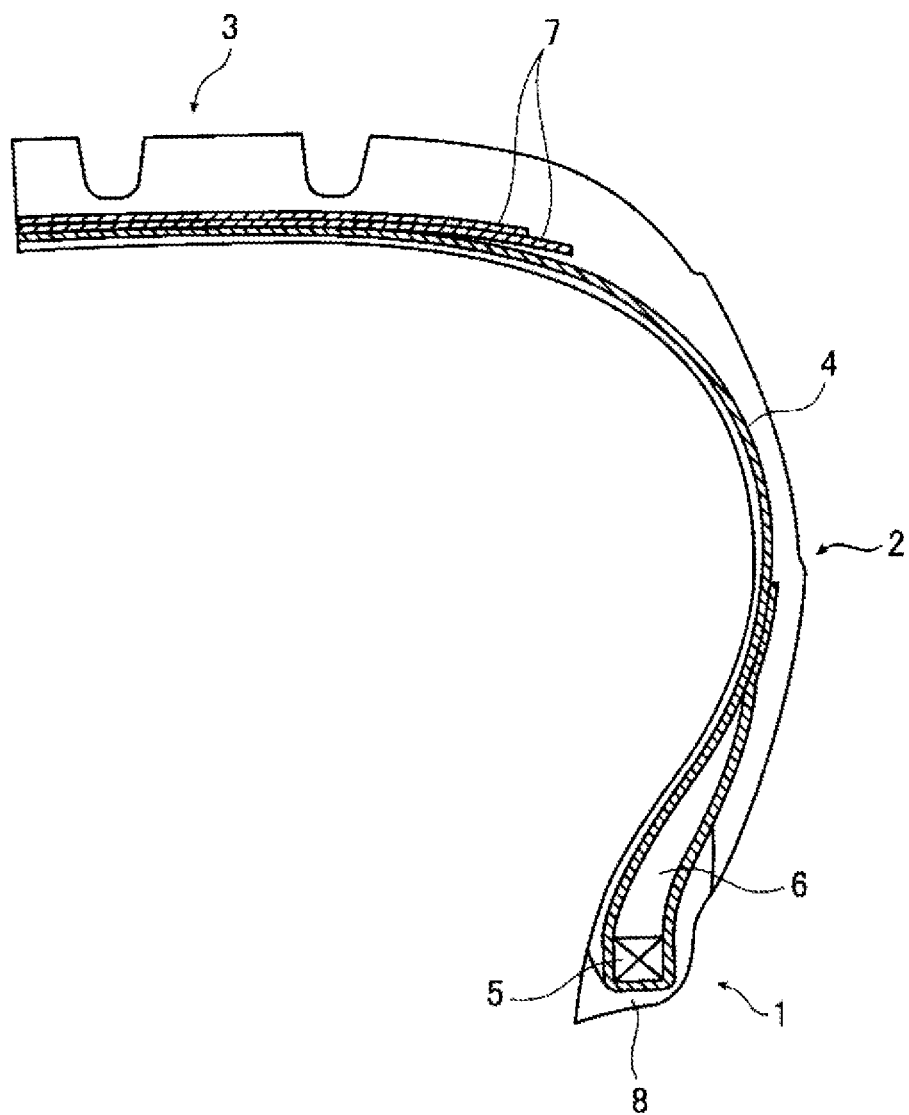

RUBBER COMPOSITION FOR TIRE TREADS AND PNEUMATIC TIRE USING SAME

This application is a U.S. National stage application of International Application No. PCT/JP2013/066085, filed on Jun. 11, 2013. This U.S. National stage application claims priority under 35 U.S.C. Section 119(a) to Japanese Patent Application No. 2012-143963, filed in Japan on Jun. 27, 2012, the entire contents of which are hereby incorporated herein by reference.

TECHNICAL FIELD

The present technology relates to a rubber composition for tire treads and a pneumatic tire.

BACKGROUND

A great many performance attributes are demanded of tires. In particular, there is a demand for steering stability during high-speed traveling, stability on wet road surfaces, reduction in rolling resistance to enable greater automobile fuel efficiency, and improvement in friction resistance.

Conventionally, in order to achieve both a reduction in rolling resistance as well as stability on wet road surfaces, in particular, silica is widely used as a reinforcing filler.

However, since silica has silanol groups on the particle surface, the particles readily agglomerate together, and when used as a reinforcing filler, there is the problem that it adversely affects tire wear resistance and mechanical characteristics.

To combat this, a technique for improving the dispersibility of silica by blending a silane coupling agent with silica is known (for example, Patent Document 1). In the examples in Japanese Unexamined Patent Application Publication No. 2000-017107A, bis(3-triethoxysilylpropyl)tetrasulfide (Si69: manufactured by Evonik Degussa Corp.) is used as a silane coupling agent (see [0027] of Japanese Unexamined Patent Application Publication No. 2000-017107A).

However, although the rubber composition for tire treads according to the above technology has better silica dispersibility than conventional compositions for tire treads, it still does not satisfy the required level.

Furthermore, another known technique for improving silica dispersibility is to blend a silane coupling agent containing a mercapto group with silica (for example, International Patent Application Publication No. WO/2006/028254).

When the present inventors studied rubber compositions for tire treads in which a silane coupling agent having a mercapto group was blended together with silica, they found that, although the required level of silica dispersibility was satisfied, Mooney viscosity was high and processability was insufficient.

SUMMARY

The present technology provides a rubber composition for tire treads having high silica dispersibility while also having excellent processability.

As a result of diligently studying the above problem, the present inventors discovered that a rubber composition for tire treads having high silica dispersibility while also having excellent processability is obtained by blending a silane coupling agent having a specified structure, and they achieved the present technology.

Specifically, the inventors discovered that the problems described above can be solved by the following features.

A rubber composition for tire treads, containing a diene rubber, silica and a silane coupling agent, wherein
the silane coupling agent is a polysiloxane represented by an average composition formula of formula (1) below,
silica content is from 5 to 200 parts by mass per 100 parts by mass of the diene rubber, and
silane coupling agent content is from 1 to 20 mass % relative to the silica content.

$$(A)_a(B)_b(C)_c(D)_d(R^1)_e SiO_{(4-2a-b-c-d-e)/2} \quad (1)$$

(wherein, in formula (1), A denotes a divalent organic group containing a sulfide group; B denotes a monovalent hydrocarbon group having from 5 to 20 carbons; C denotes a hydrolyzable group; D denotes an organic group containing a mercapto group; $R^1$ denotes a monovalent hydrocarbon group having from 1 to 4 carbons; and a to e satisfy the relationships $0<a<1$, $0<b<1$, $0<c<3$, $0\le d<1$, $0\le e<2$, $0<2a+b+c+d+e<4$).

(2) The rubber composition for tire treads according to item (1) above, wherein, in formula (1), A is a group represented by formula (2) below, C is a group represented by formula (3) below, and D is a group represented by formula (4) below.

$$*-(CH_2)_n-S_x-(CH_2)_n-* \quad (2)$$

(wherein, in formula (2), n denotes an integer from 1 to 10; x denotes an integer from 1 to 6; * denotes a bond position);

$$*-OR^2 \quad (3)$$

(wherein, in formula (3), $R^2$ denotes an alkyl group having from 1 to 20 carbons, an aryl group having from 6 to 10 carbons, or an alkenyl group having from 2 to 10 carbons; * denotes a bond position);

$$*-(CH_2)_m-SH \quad (4)$$

(wherein, in formula (4), m denotes an integer from 1 to 10; * denotes a bond position).

(3) The rubber composition for tire treads according to item (1) or (2) above, wherein the silane coupling agent has a mercapto group.

(4) The rubber composition for tire treads according to any one of items (1) to (3) above, wherein not less than 50 mass % of the diene rubber is aromatic vinyl-conjugated diene copolymer.

(5) The rubber composition for tire treads according to item (4) above, wherein the aromatic vinyl-conjugated diene copolymer contains from 5 to 50 mass % aromatic vinyl, and vinyl bond content in the conjugated diene is from 5 to 80%.

(6) The rubber composition for tire treads according to any one of items (1) to (5) above, wherein nitrogen adsorption specific surface area is from 100 to 300 m²/g.

(7) A pneumatic tire using the rubber composition for tire treads described in any one of items (1) to (6) above.

As described below, according to the present technology, a rubber composition for tire treads having high silica dispersibility while also having excellent processability, and a pneumatic tire that uses it in the tire treads, can be provided.

BRIEF DESCRIPTION OF THE DRAWING

FIG. 1 is a partial cross-sectional schematic view of a tire that represents one embodiment of the pneumatic tire of the present technology.

DETAILED DESCRIPTION

Below, the rubber composition for tire treads of the present technology and the pneumatic tire that uses the rubber composition for tire treads of the present technology will be described.

(Rubber Composition for Tire Treads)

The rubber composition for tire treads of the present technology is a rubber composition for tire treads containing a diene rubber, silica and a silane coupling agent represented by the average composition formula of formula (1) to be described later, wherein the silica content is from 5 to 200 parts by mass per 100 parts by mass of the diene rubber, and the silane coupling agent content is from 1 to 20 mass % relative to the silica content.

The diene rubber, silica and silane coupling agent as well as other components that may be contained as desired will be described in detail below.

<Diene Rubber>

The diene rubber used in the rubber composition for tire treads of the present technology is not particularly limited, and specific examples thereof include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), butyl halide rubber (Br-IIR, Cl-IIR), and chloroprene rubber (CR). As the above diene rubbers, one type of diene rubber may be used alone, or two or more types of diene rubber may be used in combination.

In the present technology, as the diene rubber, use of an aromatic vinyl-conjugated diene copolymer rubber is preferred, and use of an aromatic vinyl-conjugated diene copolymer in combination with a butadiene rubber (BR) is more preferred, from the viewpoint of being able to produce a tire having excellent wet performance and rolling resistance.

Examples of the aromatic vinyl-conjugated diene copolymer rubber include styrene-butadiene copolymer rubber (SBR), styrene-isoprene copolymer rubber and the like, among which styrene-butadiene copolymer rubber (SBR) is preferred from the viewpoint of being able to produce a tire having excellent wet performance and rolling resistance.

The aromatic vinyl content (for example, the styrene content) of the aromatic vinyl-conjugated diene copolymer is preferably from 5 to 50 mass %, more preferably from 10 to 45 mass %, and even more preferably from 12 to 42 mass %, from the perspective of improving processability of the rubber composition.

Furthermore, from the perspective of improving processability of the rubber composition and silica dispersibility, the vinyl bond content of the conjugated diene of the aromatic vinyl-conjugated diene copolymer is preferably from 5 to 80 mass %, more preferably from 10 to 75 mass %, and even more preferably from 20 to 70 mass %. Here, vinyl bond content means the proportion of 1,2-vinyl bonds among cis-1,4-bonds, trans-1,4-bonds and 1,2-vinyl bonds, which are the bond types of conjugated diene.

Additionally, the weight average molecular weight of the aromatic vinyl-conjugated diene copolymer is from 100,000 to 2,000,000, but is more preferably from 300,000 to 1,500,000 from the perspective of increasing the effect of inhibiting a rise in viscosity of the rubber composition. The weight average molecular weight (Mw) of the aromatic vinyl-conjugated diene copolymer is measured in terms of standard polystyrene by gel permeation chromatography (GPC) using tetrahydrofuran as a solvent.

The aromatic vinyl-conjugated diene copolymer is not particularly limited in its production method, but can be produced by a conventional known method.

The aromatic vinyl and conjugated diene serving as monomers used when producing the aromatic vinyl-conjugated diene copolymer are not particularly limited.

Examples of the conjugated diene monomer include 1,3-butadiene, isoprene (2-methyl-1,3-butadiene), 2,3-dimethyl-1,3-butadiene, 2-chloro-1,3-butadiene, 1,3-pentadiene, and the like.

Examples of the aromatic vinyl monomer include styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine and the like.

In the present technology, the aromatic vinyl-conjugated diene copolymer content is not less than 50 mass %, preferably not less than 55 mass %, and more preferably not less than 60 mass %, of the total amount of the diene rubber from the perspective of being able to produce a tire having excellent wet performance.

Furthermore, if butadiene rubber (BR) is used in combination with the aromatic vinyl-conjugated diene copolymer, the butadiene rubber (BR) content is preferably less than 50 mass %, preferably less than 45 mass %, and more preferably less than 40 mass %, of the total amount of the diene rubber from the perspective of being able to produce a tire having excellent wet performance.

<Silica>

The silica contained in the rubber composition for tire treads of the present technology is not particularly limited, and can be any conventional known silica that is blended in rubber compositions used in tires and the like.

Examples of the silica include wet silica, dry silica, fumed silica and diatomaceous earth. As the above silica, one type of silica may be used alone, or two or more types of silica may be used in combination.

In the present technology, the silica is preferably wet silica from the viewpoint of being able to produce a tire having excellent wet performance and rolling resistance.

In the present technology, the nitrogen adsorption specific surface area ($N_2SA$) of the silica is preferably from 100 to 400 $m^2/g$, more preferably from 100 to 300 $m^2/g$, and even more preferably from 150 to 250 $m^2/g$, from the perspective of being able to produce a tire having excellent wet performance and rolling resistance.

Here, $N_2SA$ is a representative characteristic of the surface area that silica can use in adsorption to a rubber molecule, and is a value obtained by measuring the adsorbed quantity of nitrogen to the surface of silica according to JIS K 6217-2: 2001 "Part 2: Specific surface area determination method—nitrogen adsorption method—single-point measurement method."

In the rubber composition for use in tire treads of the present technology, the silica content is from 5 to 200 parts by mass relative to 100 parts by mass of the diene rubber, and a tire having excellent wet performance and rolling resistance can be produced, and from the viewpoint of also improving wear resistance and mechanical characteristics of the tire, it is preferably from 5 to 150 parts by mass, more preferably from 20 to 140 parts by mass, and even more preferably from 35 to 140 parts by mass.

<Silane Coupling Agent>

The silane coupling agent used in the rubber composition for tire treads of the present technology is a polysiloxane represented by the average composition formula of formula (1) below.

$$(A)_a(B)_b(C)_c(D)_d(R^1)_e SiO_{(4-2a-b-c-d-e)/2} \tag{1}$$

By blending such a polysiloxane as a silane coupling agent, a rubber composition for tire treads having high silica dispersibility and excellent processability can be obtained in the present technology.

This is estimated to be due to the following mechanism.

Because the silane coupling agent used in the present technology has a sulfide group and a polysiloxane structure, it is thought that (i) the sulfide group is reductively cleaved by acid or the like to produce a mercapto group, and is also cleaved by heating or the like to produce a thiyl radical equivalent to a mercapto group, which reacts with the double bonds of the diene rubber, and (ii) due to the polysiloxane structure being compatible with silica, good silica dispersibility is exhibited. This is also thought to be the case judging from the fact that silica dispersibility is insufficient when a silane coupling agent that has a sulfide group but does not have a polysiloxane structure is used, as shown in the comparative examples to be described later.

Furthermore, as described above, mercapto groups are produced from the sulfide groups, but the production thereof is of a suitable degree, and does not affect processability. It is also thought that, even in the case where the silane coupling agent used in the present technology has a mercapto group, the generation of thiyl radicals from mercapto groups by the sulfide groups is regulated to an appropriate degree, and excellent processability is exhibited. This is also thought to be the case judging from the fact that processability is insufficient when a silane coupling agent that does not have a sulfide group is used, as shown in the comparative examples to be described later.

In formula (1), A denotes a divalent organic group containing a sulfide group. Among these, a group represented by formula (2) below is preferred.

$$*-(CH_2)_n-S_x-(CH_2)_n-* \tag{2}$$

In formula (2), n denotes an integer from 1 to 10, among which an integer from 2 to 4 is preferred.

In formula (2), x denotes an integer from 1 to 6, among which an integer from 2 to 4 is preferred.

In formula (2), * denotes a bond position.

Specific examples of the group represented for formula (2) include *—CH$_2$—S$_2$—CH$_2$—*, *—C$_2$H$_4$—S$_2$—C$_2$H$_4$—*, *—C$_3$H$_6$—S$_2$—C$_3$H$_6$—*, *—C$_4$H$_8$—S$_2$—C$_3$H$_8$—*, *—CH$_2$—S$_4$—CH$_2$—*, *—C$_2$H$_4$—S$_4$—C$_2$H$_4$—*, *—C$_3$H$_6$—S$_4$—C$_3$H$_6$—*, *—C$_4$H$_8$—S$_4$—C$_4$H$_8$—* and the like.

In formula (1), B denotes a monovalent hydrocarbon group having from 5 to 20 carbons, specific examples of which include a hexyl group, an octyl group, a decyl group and the like. B is preferably a monovalent hydrocarbon group having from 5 to 10 carbons.

In formula (1), C denotes a hydrolyzable group, specific examples of which include an alkoxy group, a phenoxy group, a carboxyl group, an alkenyloxy group and the like. Among these, a group represented by formula (3) below is preferred.

$$*-OR^2 \tag{3}$$

In formula (3), R$^2$ denotes an alkyl group having from 1 to 20 carbons, an aryl group having from 6 to 10 carbons, an aralkyl group (aryl-alkyl group) having from 6 to 10 carbons, or an alkenyl group having from 2 to 10 carbons, among which an alkyl group having from 1 to 5 carbons is preferred. Specific examples of the alkyl group having from 1 to 20 carbons include a methyl group, an ethyl group, a propyl group, a butyl group, a hexyl group, an octyl group, a decyl group, an octadecyl group and the like. Specific examples of the aryl group having from 6 to 10 carbons include a phenyl group, a tolyl group and the like. Specific examples of the aralkyl group having from 6 to 10 carbons include a benzyl group, a phenylethyl group and the like. Specific examples of the alkenyl group having from 2 to 10 carbons include a vinyl group, a propenyl group, a pentenyl group and the like.

In formula (3), * denotes a bond position.

In formula (1), D denotes an organic group containing a mercapto group. Among these, a group represented by formula (4) below is preferred.

$$*-(CH_2)_m-SH \tag{4}$$

In formula (4), m denotes an integer from 1 to 10, among which an integer from 1 to 5 is preferred.

In formula (4), * denotes a bond position.

Specific examples of the group represented by formula (4) include *—CH$_2$SH, *—C$_2$H$_4$SH, *—C$_3$H$_6$SH, *—C$_4$H$_8$SH, *—C$_5$H$_{10}$SH, *—C$_6$H$_{12}$SH, *—C$_7$H$_{14}$SH, *—C$_8$H$_{16}$SH, *—C$_9$H$_{18}$SH, *—C$_{10}$H$_{20}$SH.

In formula (1), R$^1$ denotes a monovalent hydrocarbon group having from 1 to 4 carbons.

In formula (1), a to e satisfy the relationships 0<a<1, 0<b<1, 0<c<3, 0≤d<1, 0≤e<2, 0<2a+b+c+d+e<4.

The polysiloxane represented by the average composition formula of formula (1) is preferably a polysiloxane in which A in formula (1) is a group represented by formula (2), C in formula (1) is a group represented by formula (3), and D in formula (1) is a group represented by formula (4), because silica dispersibility is better and processability is better. Among these, it is preferably a polysiloxane having a mercapto group (0<d) because silica dispersibility is better.

In formula (1), a is preferably such that 0<a≤0.50, because rolling resistance of the obtained tire is better.

In formula (1), b is preferably such that 0<b, and more preferably such that 0.10≤b≤0.89, because rolling resistance of the obtained tire is better.

In formula (1), c is preferably such that 1.2≤c≤2.0, because rolling resistance of the obtained tire is better.

In formula (1), d is preferably such that 0.1≤d≤0.8, because rolling resistance of the obtained tire is better.

The weight average molecular weight of the polysiloxane is preferably from 500 to 2300, and more preferably from 600 to 1500, because rolling resistance of the obtained tire is better. The molecular weight of the polysiloxane in this patent application is determined via gel permeation chromatography (GPC) with toluene as a solvent, in terms of polystyrene.

The mercapto equivalent weight of the polysiloxane determined by an acetic acid/potassium iodide/potassium iodate addition/sodium thiosulfate solution titration method is preferably from 550 to 700 g/mol and more preferably from 600 to 650 g/mol, from the perspective of having excellent vulcanization reactivity.

The polysiloxane preferably has from 2 to 50 siloxane units (—Si—O—), because rolling resistance of the obtained tire is better.

No metals other than silicon atoms (for example, Sn, Ti, Al) are present in the polysiloxane skeleton.

Although the method for producing the polysiloxane is not particularly limited, a first advantageous embodiment is a method in which an organo silicon compound represented by formula (5) below and an organosilicon compound represented by formula (6) below are hydrolyzed and condensed. A second advantageous embodiment is a method in which an organosilicon compound represented by formula (5) below, an organosilicon compound represented by formula (6) below and an organosilicon compound represented by formula (7) below are hydrolyzed and condensed. A third advantageous embodiment is a method in which an organosilicon compound represented by formula (5) below, an organosilicon compound represented by formula (6) below, an organosilicon compound represented by formula (7) below and an organosilicon compound represented by formula (8) below are hydrolyzed and condensed.

Among these methods the above second advantageous embodiment is preferred because silica dispersibility is better.

[Formula 1]

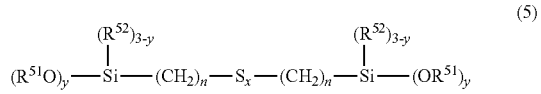

(5)

In formula (5), $R^{51}$ denotes an alkyl group having from 1 to 20 carbons, an aryl group having from 6 to 10 carbons, or an alkenyl group having from 2 to 10 carbons, among which an alkyl group having from 1 to 5 carbons is preferred. Specific examples of the alkyl group having from 1 to 20 carbons include a methyl group, an ethyl group, a propyl group, a butyl group, a hexyl group, an octyl group, a decyl group, an octadecyl group and the like. Specific examples of the aryl group having from 6 to 10 carbons include a phenyl group, a tolyl group, a naphthyl group and the like. Specific examples of the alkenyl group having from 2 to 10 carbons include a vinyl group, a propenyl group, a pentenyl group and the like.

In formula (5), $R^{52}$ denotes an alkyl group having from 1 to 20 (preferably from 1 to 10) carbons or an aryl group having from 6 to 20 (preferably from 6 to 10) carbons. Specific examples of the alkyl group having from 1 to 20 carbons include a methyl group, an ethyl group, a propyl group, a butyl group, a hexyl group, an octyl group, a decyl group and the like. Specific examples of the aryl group having from 6 to 20 carbons are the same as for $R^2$ described above.

The definition and advantageous embodiments of n in formula (5) are the same as for n described above.

The definition and advantageous embodiments of x in formula (5) are the same as for x described above.

In formula (5), y denotes an integer from 1 to 3.

Specific examples of the organosilicon compound represented by formula (5) include bis(trimethoxysilylpropyl) tetrasulfide, bis(triethoxysilylpropyl)tetrasulfide, bis (trimethoxysilylpropyl)disulfide, bis(triethoxysilylpropyl) disulfide and the like.

[Formula 2]

(6)

The definition and advantageous embodiments of $R^{61}$ in formula (6) are the same as for $R^{51}$ described above.

The definition and advantageous embodiments of $R^{62}$ in formula (6) are the same as for $R^{52}$ described above.

The definition of z in formula (6) is the same as for y described above.

In formula (6), p denotes an integer from 5 to 10.

Specific examples of the organosilicon compound represented by formula (6) include pentyl trimethoxysilane, pentyl methyl dimethoxysilane, pentyl triethoxysilane, pentyl methyl diethoxysilane, hexyl trimethoxysilane, hexyl methyl dimethoxysilane, hexyl triethoxysilane, hexyl methyl diethoxysilane, octyl trimethoxysilane, octyl methyl dimethoxysilane, octyl triethoxysilane, octyl methyl diethoxysilane, decyl trimethoxysilane, decyl methyl dimethoxysilane, decyl triethoxysilane, decyl methyl diethoxysilane and the like.

[Formula 3]

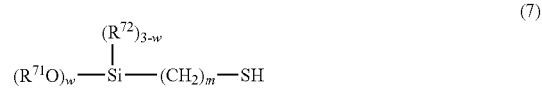

(7)

The definition and advantageous embodiments of $R^{71}$ are the same as for $R^{51}$ described above.

The definition and advantageous embodiments of $R^{72}$ are the same as for $R^{52}$ described above.

The definition and advantageous embodiments of m in formula (7) are the same as for m described above.

The definition of w in formula (7) is the same as for y described above.

Specific examples of the organosilicon compound represented by formula (7) include α-mercaptomethyl trimethoxysilane, α-mercaptomethyl methyl dimethoxysilane, α-mercaptomethyl triethoxysilane, α-mercaptomethyl methyl diethoxysilane, γ-mercaptopropyl trimethoxysilane, γ-mercaptopropyl methyl dimethoxysilane, γ-mercaptopropyl triethoxysilane, γ-mercaptopropyl methyl diethoxysilane and the like.

[Formula 4]

(8)

The definition and advantageous embodiments of $R^{81}$ in formula (8) are the same as for $R^{51}$ described above.

The definition and advantageous embodiments of $R^{82}$ in formula (8) are the same as for $R^{52}$ described above.

The definition of v in formula (8) is the same as for y described above.

In formula (8), q denotes an integer from 1 to 4.

Specific examples of the organosilicon compound represented by formula (8) include methyl trimethoxysilane, dimethyl dimethoxysilane, methyl triethoxysilane, methyl ethyl diethoxysilane, propyl trimethoxysilane, propyl methyl dimethoxysilane, propyl methyl diethoxysilane and the like.

Solvents may be used as necessary when producing the polysiloxane. The solvents are not particularly limited, but specific examples include aliphatic hydrocarbon-based solvents such as pentane, hexane, heptane and decane, ether-based solvents such as diethyl ether, tetrahydrofuran and 1,4-dioxane, amide-based solvents such as formamide, dimethylformamide and N-methylpyrrolidone, aromatic hydrocarbon-based solvents such as benzene, toluene and xylene, alcohol-based solvents such as methanol, ethanol and propanol, and the like.

Catalysts may also be used as necessary when producing the polysiloxane. The catalysts are not particularly limited, but specific examples include acidic catalysts such as hydrochloric acid and acetic acid, Lewis acid catalysts such as ammonium fluoride, alkali metal salts such as sodium hydroxide, potassium hydroxide, sodium carbonate, sodium acetate, potassium acetate, sodium hydrogencarbonate, potassium carbonate, potassium hydrogencarbonate, calcium carbonate, sodium methoxide and sodium ethoxide, amine compounds such as triethylamine, tributylamine, pyridine and 4-dimethylaminopyridine, and the like.

It is preferred that the catalyst is not an organometallic compound containing Sn, Ti or Al as a metal. If such an organometallic compound is used, the metal is introduced into the polysiloxane skeleton, and a polysiloxane represented by the average composition formula of formula (1) (in which no metals other than silicon atoms (for example, Sn, Ti, Al) are present in the polysiloxane skeleton) is not obtained.

When a silane coupling agent having a mercapto group (for example, an organosilicon compound represented by formula (7)) and a silane coupling agent other than one having a sulfide group or mercapto group (for example, an organosilicon compound represented by formula (6) or formula (8)) are used in combination as the organosilicon compound used when producing the polysiloxane, the mixing ratio (molar ratio) of the silane coupling agent having a mercapto group and the silane coupling agent other than one having a sulfide group or mercapto group is preferably from 1.1/8.9 to 6.7/3.3, and more preferably from 1.4/8.6 to 5.0/5.0, from the perspective that wet performance, rolling resistance and processability are better.

When a silane coupling agent having a mercapto group (for example, an organosilicon compound represented by formula (7)) and a silane coupling agent having a sulfide group (for example, an organosilicon compound represented by formula (5)) are used in combination as the organosilicon compound used when producing the polysiloxane, the mixing ratio (molar ratio) of the silane coupling agent having a mercapto group and the silane coupling agent having a sulfide group is preferably from 2.0/8.0 to 8.9/1.1, and more preferably from 2.5/7.5 to 8.0/2.0, from the perspective that wet performance, rolling resistance and processability are better.

When a silane coupling agent having a mercapto group (for example, an organosilicon compound represented by formula (7)), a silane coupling agent having a sulfide group (for example, an organosilicon compound represented by formula (5)), and a silane coupling agent other than one having a sulfide group or mercapto group (for example, an organosilicon compound represented by formula (6) or formula (8)) are used in combination as the organosilicon compound used when producing the polysiloxane, the amount of silane coupling agent having a mercapto group is preferably from 10.0% to 73.0% of the total quantity (moles) of the three. The amount of silane coupling agent having a sulfide group is preferably from 5.0% to 67.0% of the total quantity of the three. The amount of silane coupling agent other than one having a sulfide group or mercapto group is preferably from 16.0% to 85.0% of the total quantity of the three.

In the rubber composition for tire treads of the present technology, the silane coupling agent content is from 1 to 20 mass % relative to the silica content, and, from the perspective of further improving the silica dispersibility and processability of the rubber composition, from 1.0 to 18 mass % is preferred, from 2.0 to 16 mass % is more preferred, and from 8.0 to 15 mass % is even more preferred.

<Optional Components>

The rubber composition for tire treads according to the present technology may further contain additives as necessary within a scope that does not inhibit the effect or purpose thereof.

Examples of the above additives include various additives typically used in rubber compositions for tire treads, such as silane coupling agents other than those contained in the rubber composition for tire treads of the present technology, fillers other than silica (for example, carbon black), zinc oxide, stearic acid, antiaging agents, processing aids, processing oils, liquid polymers, terpene-based resins, thermosetting resins, vulcanizing agents, vulcanization accelerators and the like.

<Method for Producing the Rubber Composition for Tire Treads>

There are no particular restrictions on the method for producing the rubber composition for tire treads of the present technology, and one example is a method whereby each of the above-mentioned components is kneaded using a known method and device (such as a Banbury mixer, kneader, roller or the like).

In addition, the rubber composition of the present technology can be vulcanized or crosslinked under conventional, publicly known vulcanizing or crosslinking conditions.

(Pneumatic Tire)

The pneumatic tire of the present technology (hereinafter also referred to simply as "the tire of the present technology") is a pneumatic tire that uses the above rubber composition for tire treads of the present technology.

FIG. 1 is a partial cross-sectional schematic view of a tire that represents one embodiment of the pneumatic tire of the present technology, but the tire of the present technology is not limited to the mode illustrated in FIG. 1.

In FIG. 1, 1 denotes a bead portion, 2 denotes a side wall portion and 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread 3, a belt layer 7 is provided along the entire periphery of the tire on the outer side of the carcass layer 4.

Additionally, rim cushions 8 are provided in parts of the bead portions 1 that are in contact with a rim.

The tire of the present technology can be produced in accordance with a conventionally known method without particular limitation except that the rubber composition for tire treads according to the present technology is used for the treads of the pneumatic tire. In addition to ordinary air or air with an adjusted oxygen partial pressure, inert gases such as nitrogen, argon, and helium can be used as the gas with which the tire is filled.

EXAMPLES

The present technology is further described using working examples, but the present technology is not limited to these working examples.

Synthesis Example 1

Polysiloxane 1

107.8 g (0.2 mol) of bis(triethoxysilylpropyl)tetrasulfide (KBE-846, manufactured by Shin-Etsu Chemical Co., Ltd.), 95.4 g (0.4 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.) and 162.0 g of ethanol were placed in a 2 L separable flask provided with an agitator, a reflux condenser, a dropping funnel and a thermometer, and a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 14.6 g of 5% KOH/EtOH solution was added in a dropwise manner, and stirred for 2 hours at 80° C. Then, by vacuum concentration and filtration, 425.4 g of polysiloxane in the form of a brown transparent liquid was obtained. The obtained polysiloxane was used as polysiloxane 1. As measured by GPC, the average molecular weight is 860, and it is represented by the average composition formula below.

$$(-C_3H_6-S_4-C_3H_6-)_{0.083}(-C_8H_{17})_{0.667}(-OC_2H_5)_{1.50}(-C_3H_6SH)_{0.167}SiO_{0.75}$$

Synthesis Example 2

Polysiloxane 2

215.6 g (0.4 mol) of bis(triethoxysilylpropyl)tetrasulfide (KBE-846, manufactured by Shin-Etsu Chemical Co., Ltd.) and 50.0 g of ethanol were placed in a 2 L separable flask provided with a reflux condenser, a dropping funnel and a thermometer, and a mixed solution containing 7.2 g (0.40 mol) of 0.5 N HCl aqueous solution and 16.8 g of ethanol was added in a dropwise manner at room temperature while stirring, and then stirred for 30 minutes at room temperature. Further, 442.4 g (1.6 mol) of octyl triethoxysilane (KBE-3083, manufactured by Shin-Etsu Chemical Co., Ltd.), and 112.0 g of ethanol were placed in a 1 L separable flask provided with an agitator, a reflux condenser, a dropping funnel and a thermometer, and a mixed solution containing 14.4 g (0.80 mol) of 0.5 N HCl aqueous solution and 33.6 g of ethanol was added in a dropwise manner at room temperature while stirring and then stirred for 30 minutes at room temperature. This reaction solution was then added in a dropwise manner to the previous 2 L separable flask. A mixed solution of 10.8 g (0.60 mol) of 0.5 N HCl aqueous solution and 25.2 g of ethanol was then added in a dropwise manner and stirred for 2 hours at 80° C., and then 15.7 g of 5% KOH/EtOH solution was added in a dropwise manner and stirred for 2 hours at 80° C. This reaction solution was distilled under reduced pressure and filtered to obtain 428.3 g of polysiloxane in the form of a brown transparent liquid. The obtained polysiloxane was used as polysiloxane 2. As measured by GPC, the average molecular weight is 880, and it is represented by the average composition formula below.

$$(-C_3H_6-S_4-C_3H_6-)_{0.167}(-C_8H_{17})_{0.667}(-OC_2H_5)_{1.50}SiO_{0.75}$$

Synthesis Example 3

Comparative Polysiloxane 572.4 g (2.4 mol) of γ-mercaptopropyl triethoxysilane (KBE-803, manufactured by Shin-Etsu Chemical Co., Ltd.) and 162.0 g of ethanol were placed in a 2 L separable flask provided with an agitator, a reflux condenser, a dropping funnel and a thermometer, and a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 15.7 g of 5% KOH/EtOH solution was added in a dropwise manner, and stirred for 2 hours at 80° C. Then, by vacuum concentration and filtration, 420.1 g of polysiloxane in the form of a colorless transparent liquid was obtained. The obtained polysiloxane was used as comparative polysiloxane. As measured by GPC, the average molecular weight is 750, and it is represented by the average composition formula below.

$$(-C_3H_6-SH)_{1.0}(C_2H_5O)_{1.50}SiO_{0.75}$$

Working Examples 1 to 3 and Comparative Examples 1 to 3

The components shown in Table 1 below were blended in the proportions (parts by mass) shown in Table 1 below.

With the exception of the sulfur and the vulcanization accelerator, the components shown in Table 1 below were mixed for 5 minutes in a sealed 1.7 L Banbury mixer, and then the rubber was released and cooled to room temperature, to obtain a master batch.

Next, a rubber composition for tire treads was obtained by mixing the sulfur and the vulcanization accelerator with the obtained master batch using the aforementioned Banbury mixer.

The amounts of SBR in Table 1 are as follows: the upper values are the amounts (units: parts by mass) of SBR (oil extended product), and the lower values are the net amounts (units: parts by mass) of SBR contained in the SBR (oil extended product).

(Mooney Viscosity)

The Mooney viscosity of the prepared (unvulcanized) rubber composition was measured in accordance with JIS K 6300-1:2001 using an L-shaped rotor, a pre-heating time of 1 minute, a rotor rotation time of 4 minutes and a test temperature of 100°. The measured values are shown in Table 1 below. The smaller the value, the better the processability.

(Payne Effect)

Using a strain-shearing stress measurement device (RPA 2000, manufactured by Alpha Technologies), the prepared (unvulcanized) rubber composition was vulcanized for 20 minutes at 160°, the shearing stress G' at a strain of 0.28% and the shearing stress G' at a strain of 30.0% were measured, and the difference G' 0.28 (MPa)−G' 30.0 (MPa) was calculated as the Payne effect.

The calculated results were recorded in Table 1 below as an index, with the value for Comparative Example 1 being taken as 100. A smaller index means a lower Payne effect and superior silica dispersibility.

TABLE 1

|  | Comparative Example 1 | Comparative Example 2 | Comparative Example 3 | Working Example 1 | Working Example 2 | Working Example 3 |
|---|---|---|---|---|---|---|
| SBR | 96.3 (70) | 96.3 (70) | 96.3 (70) | 96.3 (70) | 96.3 (70) | 96.3 (70) |
| BR | 30.0 | 30.0 | 30.0 | 30.0 | 30.0 | 30.0 |
| Silica | 70 | 70 | 70 | 70 | 70 | 70 |
| Carbon black | 5 | 5 | 5 | 5 | 5 | 5 |
| Silane coupling agent | 7.0 | 5.0 |  |  |  |  |
| Polysiloxane 1 |  |  |  | 7.0 |  |  |
| Polysiloxane 2 |  |  |  |  | 7.0 | 5.0 |
| Comparative polysiloxane |  |  | 7.0 |  |  |  |
| Zinc oxide | 3 | 3 | 3 | 3 | 3 | 3 |
| Stearic acid | 2 | 2 | 2 | 2 | 2 | 2 |
| Antiaging agent | 3 | 3 | 3 | 3 | 3 | 3 |
| Process oil | 10 | 10 | 10 | 10 | 10 | 10 |
| Sulfur | 2 | 2 | 2 | 2 | 2 | 2 |
| Vulcanization accelerator 1 | 2 | 2 | 2 | 2 | 2 | 2 |
| Vulcanization accelerator 2 | 1 | 1 | 1 | 1 | 1 | 1 |
| Mooney viscosity (ML (1 + 4) 100° C.) | 60 | 63 | 71 | 58 | 57 | 59 |
| Payne effect index | 100 | 105 | 67 | 81 | 84 | 91 |

The details of each component shown in Table 1 are as follows.

SBR: E581 (manufactured by Asahi Kasei Corporation), oil extended product (containing 37.5 parts by mass of extended oil per 100 parts by mass of SBR; net SBR in SBR is 72.7 mass %), styrene content: 40 mass %, vinyl bond quantity: 44%, weight average molecular weight: 1,260,000

BR: Nipol BR1220 (manufactured by Zeon Corporation)

Silica: ULTRASIL VN3GR ($N_2SA$=170 $m^2$/g, manufactured by Evonik Industries Corp.)

Carbon black: SEAST KHP (manufactured by Tokai Carbon Co., Ltd.)

Silane coupling agent: Si69 (manufactured by Evonik Degussa Corp.) (bis(3-triethoxysilylpropyl)tetrasulfide)

Polysiloxane 1: Polysiloxane 1 synthesized as described above

Polysiloxane 2: Polysiloxane 2 synthesized as described above

Comparative polysiloxane: Comparative polysiloxane 1 synthesized as described above Zinc oxide: Zinc oxide No. 3 (manufactured by Seido Chemical Industry Ltd.)

Stearic acid: stearic acid beads (manufactured by Nippon Oil & Fats Co., Ltd.)

Antiaging agent: Santoflex 6PPD (manufactured by Flexsys)

Process oil: Extract No. 4 S (manufactured by Showa Shell Sekiyu K.K.)

Sulfur: "Golden Flower" oil-treated sulfur powder (manufactured by Tsurumi Chemical Industry Co., Ltd.)

Vulcanization accelerator 1: NOCCELER CZ-G (manufactured by Ouchi Shinko Chemical Industrial Co., Ltd.)

Vulcanization accelerator 2: Soxinol D-G (manufactured by Sumitomo Chemical Co., Ltd.)

As is clear from Table 1, compared to Comparative Examples 1 and 2 which use a silane coupling agent that has a sulfide group but does not have a polysiloxane structure (Si69), Working Examples 1 to 3, which used a polysiloxane represented by the average composition formula of formula (1) above as a silane coupling agent, had higher silica dispersibility and the same or better processability.

Comparative Example 3, which used a polysiloxane not having a sulfide group as a silane coupling agent, had high silica dispersibility but processability was insufficient.

In a comparison of Working Examples 1 and 2, Working Example 1, in which the polysiloxane had a mercapto group, exhibited higher silica dispersibility.

What is claimed is:

1. A rubber composition for tire treads, containing a diene rubber, silica and a silane coupling agent; wherein
the silane coupling agent is a polysiloxane represented by an average composition formula of formula (1) below;
silica content is from 5 to 200 parts by mass per 100 parts by mass of the diene rubber; and
silane coupling agent content is from 1 to 20 mass % relative to the silica content:

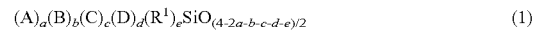

$$(A)_a(B)_b(C)_c(D)_d(R^1)_e SiO_{(4-2a-b-c-d-e)/2} \quad (1)$$

(wherein, in formula (1), A denotes a divalent organic group containing a sulfide group; B denotes a monovalent hydrocarbon group having from 5 to 20 carbons; C denotes a hydrolyzable group; D denotes an organic group containing a mercapto group; $R^1$ denotes a monovalent hydrocarbon group having from 1 to 4 carbons; and a to e satisfy the relationships 0<a<1, 0<b<1, 0<c<3, 0<d<1, 0≤e<2, 0<2a+b+c+d+e<4).

2. The rubber composition for tire treads according to claim 1, wherein, in formula (1), A is a group represented by formula (2) below, C is a group represented by formula (3) below, and D is a group represented by formula (4) below:

$$*-(CH_2)_n-S_x-(CH_2)_n-* \quad (2)$$

(wherein, in formula (2), n denotes an integer from 1 to 10; x denotes an integer from 1 to 6; * denotes a bond position);

$$*-OR^2 \quad (3)$$

(wherein, in formula (3), $R^2$ denotes an alkyl group having from 1 to 20 carbons, an aryl group having from 6 to 10 carbons, or an alkenyl group having from 2 to 10 carbons; * denotes a bond position);

 (4)

(wherein, in formula (4), m denotes an integer from 1 to 10; * denotes a bond position).

3. The rubber composition for tire treads according to claim 1, wherein not less than 50 mass % of the diene rubber is aromatic vinyl-conjugated diene copolymer.

4. The rubber composition for tire treads according to claim 3, wherein the aromatic vinyl-conjugated diene copolymer contains from 5 to 50 mass % aromatic vinyl, and vinyl bond content in the conjugated diene is from 5 to 80%.

5. The rubber composition for tire treads according to claim 1, wherein a nitrogen adsorption specific surface area of the silica is from 100 to 300 $m^2/g$.

6. A pneumatic tire using the rubber composition for tire treads described in claim 1.

7. The rubber composition for tire treads according to claim 2, wherein not less than 50 mass % of the diene rubber is aromatic vinyl-conjugated diene copolymer.

8. The rubber composition for tire treads according to claim 2, wherein a nitrogen adsorption specific surface area of the silica is from 100 to 300 $m^2/g$.

9. The rubber composition for tire treads according to claim 1, wherein not less than 50 mass % of the diene rubber is aromatic vinyl-conjugated diene copolymer.

10. The rubber composition for tire treads according to claim 1, wherein a nitrogen adsorption specific surface area of the silica is from 100 to 300 $m^2/g$.

11. The rubber composition for tire treads according to claim 3, wherein a nitrogen adsorption specific surface area of the silica is from 100 to 300 $m^2/g$.

12. The rubber composition for tire treads according to claim 4, wherein a nitrogen adsorption specific surface area of the silica is from 100 to 300 $m^2/g$.

13. The rubber composition for tire treads according to claim 2, wherein not less than 50 mass % of the diene rubber is aromatic vinyl-conjugated diene copolymer.

14. The rubber composition for tire treads according to claim 2, wherein a nitrogen adsorption specific surface area of the silica is from 100 to 300 $m^2/g$.

15. The rubber composition for tire treads according to claim 7, wherein a nitrogen adsorption specific surface area of the silica is from 100 to 300 $m^2/g$.

16. The rubber composition for tire treads according to claim 9, wherein a nitrogen adsorption specific surface area of the silica is from 100 to 300 $m^2/g$.

17. The rubber composition for tire treads according to claim 13, wherein a nitrogen adsorption specific surface area of the silica is from 100 to 300 $m^2/g$.

18. A pneumatic tire using the rubber composition for tire treads described in claim 2.

* * * * *